Oct. 23, 1928.
D. H. STEWART
1,688,441
LENS ATTACHMENT MOUNT FOR PHOTOGRAPHIC APPARATUS
Filed Jan. 17, 1928
2 Sheets-Sheet 1
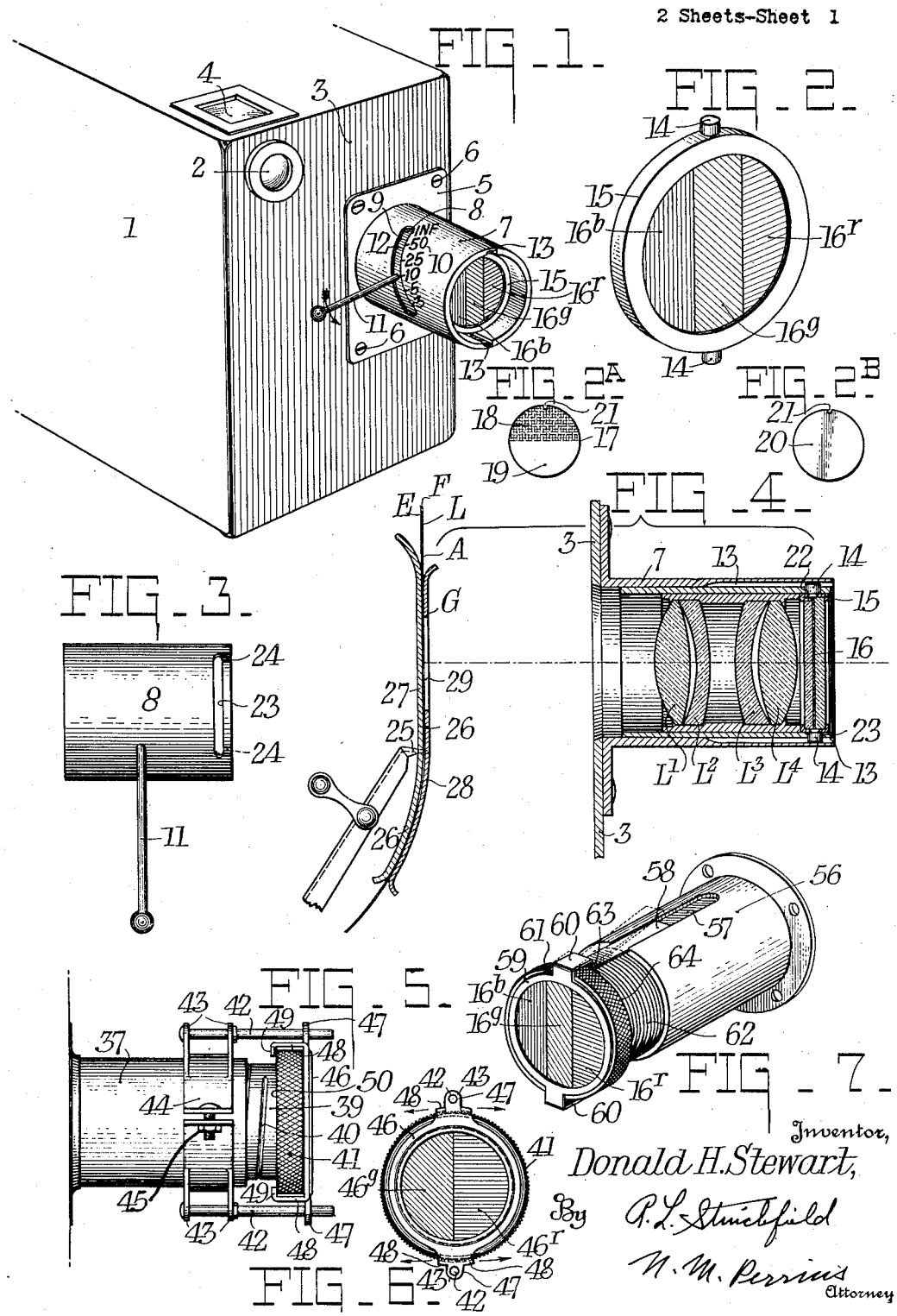
Inventor,
Donald H. Stewart,
By P. L. Stutchfield
N. M. Perrins
Attorney Oct. 23, 1928.
D. H. STEWART
1,688,441
LENS ATTACHMENT MOUNT FOR PHOTOGRAPHIC APPARATUS
Filed Jan. 17, 1928
2 Sheets-Sheet 2
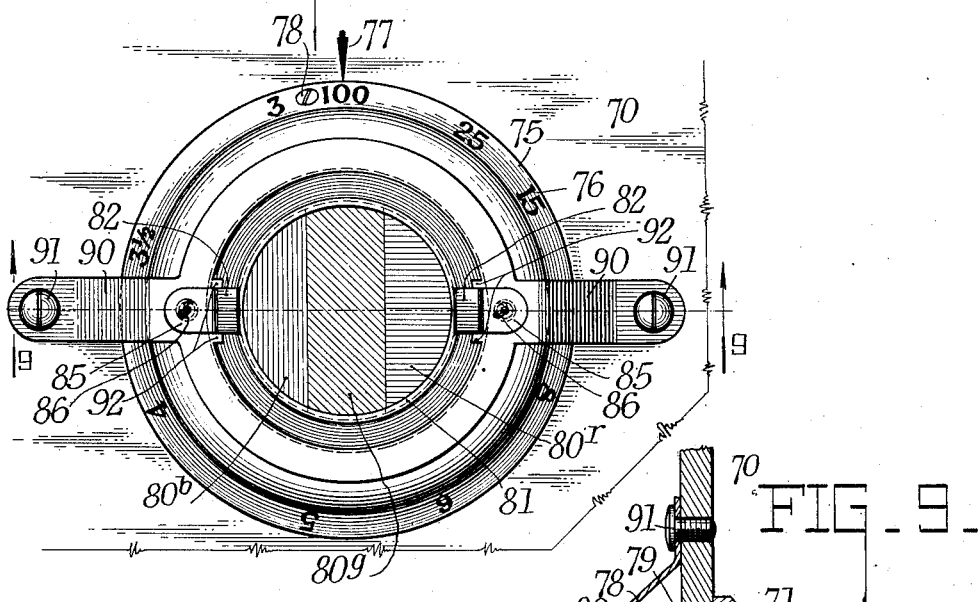
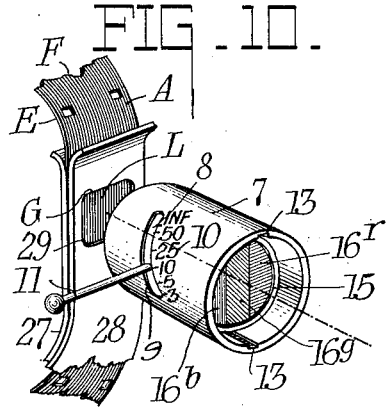
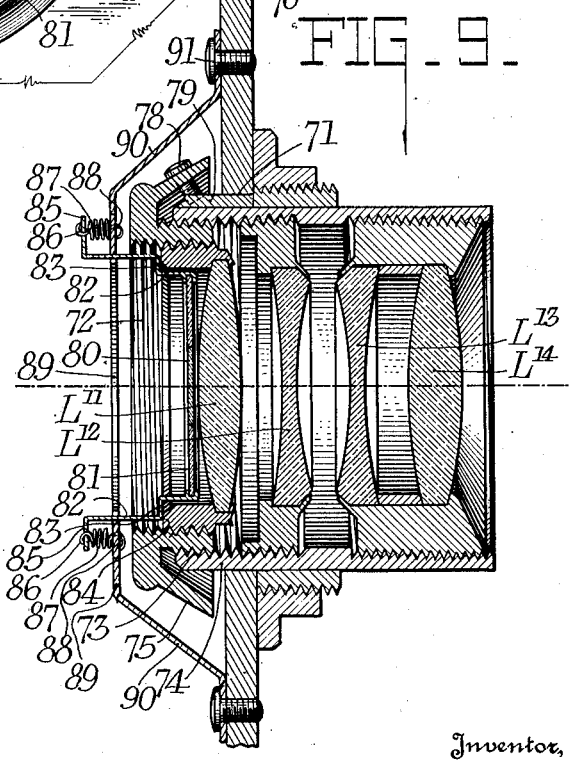
Inventor,
Donald H. Stewart,
Attorneys Patented Oct. 23, 1928.

1,688,441

UNITED STATES PATENT OFFICE.

DONALD H. STEWART, OF ROCHESTER, NEW YORK, ASSIGNOR TO EASTMAN KODAK COMPANY, OF ROCHESTER, NEW YORK, A CORPORATION OF NEW YORK.

LENS-ATTACHMENT MOUNT FOR PHOTOGRAPHIC APPARATUS.

Application filed January 17, 1928. Serial No. 247,376. REISSUED

This invention relates to photography and more particularly to mounts in which lens attachments may be carried on cameras or projectors. One object of my invention is to provide a mount suitable for holding a banded filter with the bands in a predetermined relation with respect to the film gate. Another object is to provide a filter mount which may be moved to and from the film gate, and which will not turn in its mount. Another object is to provide a mount for attachments adapted to be used with lenses which are turned in their mounts for focusing. Another object is to provide a mount which may be moved by the turning lens, there being a slidable connection between lens and mount. Another object is to provide a slidable connection between the lens and the mount, and a slidable connection between the mount and the lens support, and other objects will appear from the following specification, the novel features being particularly pointed out in the claims at the end thereof.

In some types of photographic apparatus such as cameras or projectors employing lenses, particularly where the objectives are of short focal length, focusing is accomplished by turning the objective. With such focusing mechanism there has been no way of using lens attachments which require special positioning with respect to the film gate of the camera, such as banded color filters, sky filters and distortion attachments, although the symmetrical attachments such as plain filters, portrait lenses, and the like are not affected by turning. My present invention is particularly directed to overcoming these difficulties, by providing a mount in which any filter or attachment may be used on the turning lens type of focusing camera, in which the attachment itself will not turn.

Coming now to the drawings wherein like reference characters denote like parts throughout:

Fig. 1 is a perspective view of a camera employing a focusing objective and a lens attachment holder constructed in accordance with and embodying a preferred form of my invention;

Fig. 2 is a perspective view of an attachment holder used in Fig. 1 on an enlarged scale;

Fig. 2ª is a front plan view of a sky filter which may be used in the holder shown in Fig. 2;

Fig. 2ᵇ is a front plan view of a prismatic lens which may be used in the holder shown in Fig. 2;

Fig. 3 is a side elevation of the objective including an arm by which it is moved to and from the mount;

Fig. 4 is a fragmentary side elevation showing parts of the photographic apparatus employing the focusing mechanism shown in Fig. 1;

Fig. 5 is a side elevation of a second embodiment of my invention;

Fig. 6 is a front plan view of the device shown in Fig. 5;

Fig. 7 is a perspective view of still another embodiment of my invention;

Fig. 8 is a third embodiment of my invention;

Fig. 9 is a section on line 9—9 of Fig. 8; and

Fig. 10 is a fragmentary perspective view of the camera shown in Fig. 1, showing the relation of the filter bands and lenticular film elements.

In the following specification and claims the word "objective" is used in its generic sense to include not only the glass lenses which are used to make the objective, but also the tubular member or cell in which the lenses are mounted. This is done to distinguish from the lens mount which here refers to the tubular member in which the objective as a whole may move for focusing.

Although my invention is equally applicable to both photographic cameras and projectors I have here shown it as being applied to a simple type of motion picture camera. As shown in Fig. 1 this may consist of the usual type of box like housing 1, having a finder lens 2 in the front wall 3 for directing an image which may be reflected to the viewing lens 4. Since the elements of the camera are not essential to this invention, the camera itself will not be further described.

On the front wall 3 there is a plate 5 attached by screws 6 and supporting a tubular mount 7 in which an objective 8 may move for focusing. In this embodiment there is an arcuate slot 9 in the wall of tube 7, and a focusing scale 10 is provided along an edge of this angularly disposed slot. An operating arm 11 extends out through the slot so that by moving this arm the walls 12 of the slot cam the arm 11 thus moving the objective for focusing the camera.

Such structure is well known in the photographic art, being used for cameras, projectors, and other apparatus where a focusing objective is required. In accordance with my invention the lens tube 7 is provided with a pair of tracks or grooves 13 which form a slideway for shoes or projections 14 carried by an annular member 15 which forms the lens attachment mount. Any desired lens attachment may be placed in this mount, although it is particularly adapted for holding color filters which may, as shown in Fig. 2, consist of a plurality of parallel vertical bands $16^b$, $16^g$, and $16^r$. In this filter $16^b$ indicates a blue section; $16^g$, a green section; and $16^r$, a red section, this type filter being especially adapted for use with a color process in which a special film F is used, this film having a series of minute lenticular elements L on one face A thereof, and the usual gelatino silver halid emulsion E on the opposite face thereof. Fig. 10 shows the parallel relation of the filter bands and lenticular elements.

The attachment holder may, of course, also be used with other lens attachments such as the sky filter 17 shown in Fig. $2^a$. This sky filter has a yellow portion 18 and a clear portion 19 such as is well known in the photographic art.

If desired the distortion attachment 20 shown in Fig. $2^b$ may be used, this attachment being in the form of a cylindrical lens. In both the attachments I preferably provide a registration notch 21 which may cooperate with a lug 22 (see Fig. 4) formed on the annular member 15 so that the attachment may be held in the proper position with respect to the film gate G.

As the shoes 14 engage the slideways 13 it is obvious that the holder 15 may slide in the lens mount 7 but may not turn. In order to slide the mount and to keep it in a fixed position with relation to its distance from the lenses $L^1$, $L^2$, $L^3$, and $L^4$ which make up the objective I provide bayonet slots 23 in the edge of the tubular member carrying the lenses. Thus slots 23 are parallel to the end of the tubular member, and at one end 24 extend out to the edge.

When the handle 11 in the embodiment shown in Fig. 1 has been moved in the direction indicated by the arrow to its further extent of movement, portions 24 of the slot are brought into registration with the slideways 13. The walls of slot 23 also form a track or slideway for the shoes 14, and when the objective is moved forward as above described the lens attachment may be pushed inwardly so that the shoes 14 engage both tracks. By moving the handle 11 in an opposite direction to that shown by the arrow to focus the objective, the shoes 14 engage both slideways, slideway 13 preventing the holder from turning and slideway 23 moving the holder back and forth with the objective.

In order to remove the holder 15 it is only necessary to move the objective forward as far as possible, at which time the ends 24 of the bayonet slots being in alignment with the grooves 13 permit the holder to slip from the lens barrel 7.

As indicated in Fig. 4, film F whether in a camera or a projector is preferably intermittently advanced by a platen claw 25 which may be of any well known construction, this claw operating through a slot, the ends of which are indicated at 26 in the plate 27 which holds the film in the focus of the objective. A presser plate 28 is preferably employed, this plate having an exposure aperture 29 which is fixed with respect to the camera wall 3 and the objective mount 7. Thus by providing the tracks 13 in the mount 7 for guiding the attachment holder 15 and by providing a registering device for holding the lens attachment in a fixed position relative to the holder 15, the position of the lens attachment will always be the same relative to the film gate; although, of course, the distance between the film gate and the lens attachment will be altered as the objective is focused.

In case it is desirable to equip cameras or projectors which are on the market with an attachment holder which retains the attachment in a definite position with respect to the film gate, the embodiment of my invention, shown in Fig. 5, may be used. Here the lens mount 37 receives the objective 39, this member being provided with a spiral groove 40 which engages a thread (not shown) in the lens mount 37, thus forming a quick acting screw. In order to turn the lens mount 39 there is a notched knurled member 41.

The slideway for preventing the attachment mount from turning in this case consists of a pair of rails 42 supported by lugs 43 extending from the annular member 44 which may be pinched upon the lens tube 37 by means of a bolt 45. The filter mount 46, here shown as containing two filter sections $46^g$ and $46^r$ for two-color photography, is provided with a pair of eyes 47 which engage a slide on the rails 42, and to each side of the eyes 47 are lugs 48 having bent over flanges 49 which engage the smooth edge 50 of the knurled member. As will be seen from Fig. 6, practically the entire periphery of the knurling 41 remains uncovered when the attachment is in place so that there is ample room for focusing the objective by turning the knurling. The attachment holder will be moved back and forth by the objective as before.

When it is desired to remove this attachment, bolt 45 may be loosened so that member 44 may be slid on the lens barrel 37 to disengage the slideway from the eyes 47. The attachment holder may then be moved sideways, as indicated by the arrows in Fig. 6, from the knurled focusing member.

Fig. 7 shows still another embodiment of my invention in which the lens barrel 56 is equipped with slideways 57 in the form of grooves into which resilient arms 58 carried by the attachment holder 59 may snap, being held in this position by spring tension. In this embodiment like that first described the attachment holder supports a filter of three sections $16^b$, $16^g$, and $16^r$. It should be noted that the resilient arms 58 are provided with an offset portion 60 which extends beyond and does not touch the knurled edge 61 of the threaded tube 62 which is screwed to and from the lens mount 56 for focusing.

At the end of the offset 60 there is a shoulder 63 which engages the rear surface 64 of the knurled member so that when the knurled member is turned to focus the lens the filter will be moved back and forth with it, and will be prevented from turning by means of the arms 58 engaging in the slideways 57.

In all of the above described embodiments of my invention the entire objective is moved for focusing the camera. My invention is equally useful when applied to one of the focusing objectives of the type in which one or more of the lenses is moved relative to the others to focus a camera. Such a lens is shown in Patent No. 1,394,078, C. W. Frederick, October 18, 1921.

In Figs 8 and 9 I have illustrated my invention as applied to the device shown in this patent. This type of lens is particularly useful for a camera or projector having a fixed main support 70 which is apertured at 71 to receive the objective here shown as consisting of lenses $L^{11}$, $L^{12}$, $L^{13}$, and $L^{14}$. Since the objective is the same as that shown in the patent it will not be necessary to describe it further than to say that $L^{11}$ is moved to and from the remaining lenses to focus the camera by means of the annular member 72 which has a threaded engagement at 73 with a fixed barrel 74.

Member 72 is provided with a skirt or flange 75 on which there is a focusing scale 76 which may be brought opposite a pointer 77 to indicate the desired focus. A screw 78 by striking a lug 79 prevents the annular member from becoming disengaged with the threaded barrel.

In applying a color filter to this objective it is desirable to have the filter designated broadly as 80 always positioned in a predetermined relation to lens $L^{11}$. To do this the following structure is used: The filter 80 which is here shown in three sections, $80^b$, $80^g$, and $80^r$, designating blue, green, and red light transmitting areas, is held in an annular frame 81, this frame being supported by a pair of arms 82 having an offset or stop 83 adapted to rest on the edge 84 of the cell which holds the front lens $L^{11}$. These arms are bent over at 85 and hold the ends 86 of springs 87 anchored at 88 to the annular member 89 which is supported by a pair of arms 90 affixed to member 70 in any suitable manner, such as by screws 91.

Since the distance the focusing member 72 moves is comparatively slight only a small range of movement of the filter member is necessary. The springs 87 draw the ends 85 of the filter arms downwardly until portions 83 of these arms are seated on the edge of the lens cell. Thus, the filter is always definitely positioned with respect to lens $L^{11}$ by means of the springs 87.

For preventing the filter 80 from turning as the lens $L^{11}$ is turned the annular member 89 is provided with a track or guideway which in this instance is composed of a pair of lugs or arms 92 which are of sufficient width to closely fit about the arms 83 which support the filter. Thus the filter is guided in this track as the focusing member 72 is turned upon the thread 73, and in this way the parallel filter bands $80^b$, $80^g$, and $80^r$ are always held in a constant position with respect to the film gate of the photographic apparatus on which the above described focusing lens may be used.

It should be noted that in all of the illustrated embodiments of my invention the lens attachment holder is prevented from turning as the lens is focused, and it is held in the proper position with respect to the objective at the same time. This is particularly useful in certain types of natural color photography where the filter must bear a definite and fixed relation to both the objective and to the film gate, that is, in color photography of the type where cylindrical lenticular film elements are used, the color bands of the filter must be parallel or substantially parallel to the lenticular elements, and the filter must be located in a predetermined position with respect to the objective.

While I have illustrated my invention as applied chiefly to a motion picture camera or projector, I do not wish to limit it to such use, since obviously it is equally suitable for use with cameras or projectors or other photographic apparatus in which an attachment must be retained on the objective in such a way that it will move with the objective, and at the same time will bear a predetermined relation to the film gate.

Having thus described my invention, what I claim as new and desire to secure by Letters Patent is,—

1. In photographic apparatus the combination of an objective, a mount for the objective in which the objective is rotatably supported for focusing, means between the objective and mount for accomplishing a focusing movement by turning the objective in the mount, an attachment holder, and connections between the holder and the objective and between the holder and the mount for moving the attachment holder with the objective, and for preventing the attachment holder from turning.

2. In photographic apparatus the combination of an objective, a mount for the objective in which the objective is rotatably supported for focusing, means between the objective and mount for accomplishing a focusing movement by turning the objective in the mount, an attachment holder slidably mounted with respect to the objective mount, and a movable connection between the objective and holder whereby the latter may be moved on its slidable mount by turning the objective.

3. In photographic apparatus the combination of an objective, a mount for the objective in which the objective is rotatably supported for focusing, means between the objective and mount for accomplishing a focusing movement by turning the objective in the mount, a track carried by the objective mount, an attachment holder, a shoe on the holder engaging the track whereby the holder may slide on the track and connections between the objective and holder whereby the latter may be slid on the track by the objective mount.

4. In photographic apparatus the combination of an objective, a mount for the objective in which the objective is rotatably supported for focusing, means between the objective and mount for accomplishing a focusing movement by turning the objective in the mount, a track carried by the objective mount, an attachment holder, a shoe on the holder engaging the track whereby the holder may slide on the track, and means for connecting and disconnecting the holder and objective whereby the holder may be slid by the objective.

5. In photographic apparatus the combination of an objective, a mount for the objective in which the objective is rotatably supported for focusing, means between the objective and mount for accomplishing a focusing movement by turning the objective in the mount, an attachment holder, means for connecting the holder to the turnable objective, and means included in the objective mount adapted to cooperate with the holder for preventing the holder from turning as it is moved by the objective.

6. In photographic apparatus the combination of an objective, a mount for the objective in which the objective is rotatably supported for focusing, means between the objective and mount for accomplishing a focusing movement by turning the objective in the mount, a slideway carried by the objective, a slideway carried by the mount, an attachment holder, means on the holder engaging the slideways whereby the holder will be moved through one slideway and held against turning by the other slideway.

7. In photographic apparatus, the combination with a fixed lens mount, of an objective movable longitudinally of the mount, a banded filter adapted to be supported on the mount, means for holding the bands of the filter in a definite position with respect to the lens mount, and means including the objective for moving the banded filter with the objective longitudinally of the mount.

8. In photographic apparatus, the combination with a fixed lens mount, of an objective movable longitudinally of the mount, a filter having a plurality of color sections adapted to be supported on the apparatus, a holder for the filter, and means included in the holder and cooperating with the objective and mount to retain the filter bands in a fixed position relative to the mount and at a fixed distance from the objective.

9. In photographic apparatus, the combination with a fixed lens mount, of an objective relatively movable longitudinally of the mount and mounted to turn therein, an attachment holder adapted to be mounted on the apparatus, slideways on the lens mount and objective, and means carried by the lens attachment adapted to engage the slideways whereby the attachment may be moved longitudinally and held against rotation.

10. In photographic apparatus, the combination with a fixed lens mount, of an objective relatively movable longitudinally of the mount and mounted to turn therein, an attachment holder adapted to be mounted on the apparatus, means for holding the attachment holder at a fixed distance with respect to the objective, and means for holding the attachment holder against turning.

11. In photographic apparatus, the combination with a movably mounted objective, of a relatively fixed lens mount, an attachment holder adapted to be used with the objective, means tending to hold the attachment holder a predetermined distance from the objective, and separate means for holding the attachment holder from turning with respect to the relatively fixed lens mount.

12. In photographic apparatus, the combination with a movably mounted objective, of a relatively fixed lens mount, an attachment holder, a banded filter in the holder adapted to be positioned a predetermined distance from the objective, means for holding the filter in the desired position, and separate means for registering the banded filter with respect to the relatively fixed lens mount.

13. In photographic apparatus, the combination with a lens mount, of an objective movably carried in the mount being adapted to turn therein for focusing, an attachment holder adapted to be used with the objective, means including a member attached to a fixed part of the apparatus for non-rotatably supporting the attachment holder, said means also including a guideway permitting movement of the holder with the objective as the latter is turned for focusing.

14. In photographic apparatus, the combination with a lens mount, of an objective movably carried in the mount being adapted to turn therein for focusing, an attachment holder adapted to be used with the objective, means including a member attached to a fixed part of the apparatus for non-rotatably supporting the attachment holder, said means also including a guideway permitting movement of the holder with the objective as the latter is turned for focusing, and mechanism for holding the attachment holder in a predetermined position with respect to the objective.

15. In photographic apparatus, the combination with a lens mount, of an objective adapted to turn in the lens mount for focusing, a film gate adapted to receive photographic film including a plurality of lenticular elements having a definite relation to the film gate, a color filter including a plurality of light transmitting color bands adapted to be used with the objective, means for holding the filter against the objective, and means including a slideway for holding the color bands in a predetermined position with respect to the lenticular elements of the film.

16. In photographic apparatus, in combination, an exposure gate, means for holding a photographic element at said gate, an objective support in alignment with the gate, an objective carried by the support, at least a part of said objective being mounted for helical movement in said support to focus the objective, and unsymmetrical optical element for use with said objective to modify the image made by said objective, a holder for said element carried by the apparatus in alignment with the objective, said holder being connected to the movable objective part for longitudinal movement therewith, and means for locating said holder in a definite predetermined position with respect to the gate and preventing said holder from turning with the objective part.

Signed at Rochester, New York, this 10th day of January, 1928.

DONALD H. STEWART.